United States Patent [19]
Bayerl et al.

[11] Patent Number: 5,511,115
[45] Date of Patent: Apr. 23, 1996

[54] APPARATUS AND METHOD FOR PROGRAMMING A REPERTORY DIAL BUTTON OF A STATION TERMINAL

[75] Inventors: Jeanne P. Bayerl, Red Bank; Duane Galensky, Eatontown; David F. Jones, Holmdel, all of N.J.

[73] Assignee: AT&T Corp., Murray Hill, N.J.

[21] Appl. No.: 28,094

[22] Filed: Mar. 8, 1993

[51] Int. Cl.⁶ .......................... H04M 15/00; H04M 3/00
[52] U.S. Cl. .......................... 379/142; 379/127; 379/130; 379/245; 379/246
[58] Field of Search .................. 379/127, 130, 379/142, 245, 246

[56] References Cited

U.S. PATENT DOCUMENTS

| | | | |
|---|---|---|---|
| 3,787,626 | 1/1974 | Subieta | 179/5.5 |
| 4,242,539 | 12/1980 | Hashimoto | 179/5.5 |
| 4,383,138 | 5/1983 | Castro et al. | 179/84 C |
| 4,443,664 | 4/1984 | Gange | 379/142 |
| 4,475,013 | 10/1984 | Lee et al. | 379/131 |
| 4,582,956 | 4/1986 | Doughty | 179/2 A |
| 4,723,273 | 2/1988 | Diesel et al. | 379/142 |
| 4,803,717 | 2/1989 | Marui | 379/142 |
| 4,817,133 | 3/1989 | Takahashi | 379/142 |
| 4,873,719 | 10/1989 | Reese | 379/142 |
| 4,924,496 | 5/1990 | Figa et al. | 379/142 |
| 4,942,598 | 7/1990 | Davis | 379/142 |
| 5,034,975 | 7/1991 | Grimes | 379/142 |
| 5,103,449 | 4/1992 | Jolissaint | 379/142 |
| 5,109,405 | 4/1992 | Morganstein | 379/142 |
| 5,155,761 | 10/1992 | Hammond | 379/142 |
| 5,263,084 | 11/1993 | Chaput | 379/127 |
| 5,265,145 | 11/1993 | Lim | 379/142 |
| 5,276,731 | 1/1994 | Arbel | 379/142 |
| 5,289,530 | 2/1994 | Reese | 379/142 |
| 5,343,516 | 8/1994 | Callele | 379/142 |

Primary Examiner—Stephen Chin
Assistant Examiner—Vijay Shankar
Attorney, Agent, or Firm—John A. Caccuro

[57] ABSTRACT

At a station apparatus, a programmable button is programmed in response to a first button depression occurring during the display of an incoming caller identification number (CID), the CID number being stored in a memory location associated with the programmable button. This programmable button enables a called party, who may be busy on another call, to store the CID number being displayed at his/her station set under the programmable button. Thereafter, when the user completes the present call he/she may go off-hook and press the programmed button to repertory dial the CID number stored under the programmed button. At a station terminal having a speakerphone, an on-hook user may press the programmed button to go off-hook, at the speakerphone, and dial the CID number stored under the programmed button. Virtual buttons, which are activated by predetermined combinations of touch-tone pad operations (e.g., #1, #2 etc.) at a station terminal, could also be used to save the CID number in a table entry associated with the virtual button and also used to repertory dial the stored CID number. In another embodiment, a station terminal includes control and data memory necessary to perform the above-described programmable or virtual button features.

17 Claims, 4 Drawing Sheets

FIG. 2 CALL RECORD TABLE 200

| CALL/CO LINE NO. | LINE STATUS | CURRENT CID | CALLER NAME | DATE | TIME | MISC | ACTIVE EXTENSIONS | PROGRAMMED EXTENSIONS |
|---|---|---|---|---|---|---|---|---|
| 1 | ALERTING | 908-555-1212 | ------- | ---- | ---- | ---- | 1-5 | 1-5 |
| 2 | IDLE | -------------- | ------- | ---- | ---- | ---- | ------- | 1-10 |
| 3 | OUT-CALL | -------------- | ------- | ---- | ---- | ---- | 6 | 1-10 |
| 4 | IN-CALL | 908-454-3434 | ------- | ---- | ---- | ---- | 3,7 | 1-7 |
| 5 | TRANS-ALERT | 313-667-2222 | ------- | ---- | ---- | ---- | 4 | 1-5 |

FIG. 3

EXTENSION STATUS TABLE 300

| EXT. | TERMINAL TYPE | SPEAKERPHONE | SWITCHHOOK STATE | ACTIVE LINE STATUS | DISPLAY CONTENTS | CURRENT FACILITY SELECTION |
|---|---|---|---|---|---|---|
| 1 | ETR | Y | ON-HOOK | LINE 1 ALERTING | 908-555-1212 | LINE 1 |
| 2 | ETR | Y | ON-HOOK | LINE 1 ALERTING | 908-555-1212 | LINE 1 |
| 3 | ETR | N | OFF-HOOK | LINE 1 ALERTING<br>INCOMING CALL ON LINE 4 | 908-454-3434 | LINE 4 |
| 4 | ETR | N | ON-HOOK | LINE 1 ALERTING<br>LINE 5 TRANSFER-ALERT | 313-667-2222 | LINE 5 |
| 5 | T/R | N | ON-HOOK | LINE 1 ALERTING | 908-555-1212 | LINE 1 |
| 6 | ETR | N | OFF-HOOK | OUTGOING CALL ON LINE 3 | DATE AND DAY | LINE 3 |
| 7 | ETR | Y | ON-HOOK | -------- | DATE AND DAY | N/A |
| 8 | T/R | N | OFF-HOOK | INCOMING CALL ON LINE 4 | 908-454-3434 | LINE 4 |
| 9 | ETR | Y | ON-HOOK | -------- | DATE AND DAY | N/A |
| 10 | ETR | Y | ON-HOOK | PRESELECTED LINE 4 | 908-454-3434 | LINE 4 |

PROGRAMMABLE BUTTON ASSIGNMENT TABLE 400

| | BUTTON A | BUTTON B | BUTTON C |
|---|---|---|---|
| EXTENSION 1 | 908-555-1212 | NOT PROGRAMMED | NA |
| ⋮ | ⋮ | ⋮ | ⋮ |
| EXTENSION 7 | NOT PROGRAMMED | 201-444-8888 | NA | ns" filed concurrently herewith and assigned to the same Assignee hereof.

APPARATUS AND METHOD FOR PROGRAMMING A REPERTORY DIAL BUTTON OF A STATION TERMINAL

CROSS-REFERENCE TO RELATED APPLICATION

Related subject matter is disclosed in co-pending application entitled "Communication System Utilizing Information Received During a Silent Interval Between Ringing Signals" filed concurrently herewith and assigned to the same Assignee hereof.

TECHNICAL FIELD

This invention relates to telephone communication systems and, more particularly, to an apparatus and method for programming an automatic telephone number dialing button for use therewith.

BACKGROUND OF THE INVENTION

The utilization of information received during a silent interval between ringing signals, including an incoming call line identification number, is now being incorporated into new private or subscriber-owned communication systems (e.g., key or private branch exchanges (PBX) systems).

One known system is described in U.S. Pat. No. 4,924,496 issued to R. Figa et al. on May 8, 1990. This patent describes an automatic incoming telephone call number display system for detecting an incoming call and identifying the party associated with the incoming call number. The system includes a directory of telephone numbers and parties associated with those numbers. Circuitry detects the origin telephone number of an incoming telephone call and compares that number with numbers in the directory to identify the calling party. A user may access the memory, using control buttons, to select and display a stored telephone call number and party associated with that number. Thereafter, the user may auto-dial the displayed number by pressing a dial button.

In certain situations a user may not want to store all of the received incoming telephone call numbers (as described in the Figa patent) and, thereafter, have to sort through all of the stored incoming telephone call numbers to select the number that he/she would want to dial. For example, when a called party is busy on a call on one line, there exists a need for that party to selectively capture a second incoming telephone call number received on a second line, so that the called party may quickly return the call when he or she is finished with the present call.

SUMMARY OF THE INVENTION

In accordance with the present invention, a programmable button is programmed in response to a first button depression occurring during the display of an incoming caller identification number (CID), the CID number being stored in a memory associated with the programmable button. This programmable button enables a called party to store the CID number being displayed at his station set under the programmable button. Thereafter, when the user completes the present call he/she may go off-hook and press the programmed button to dial the CID number stored under the programmed button. According to another feature of the invention, an on-hook user presses the programmed button to go off-hook and dial the CID number stored under the programmed button.

According to another feature, virtual buttons, which are activated by predetermined combinations of touch-tone pad operations (e.g., #1, #2 etc.) could also be used to save the CID number in a table entry associated with the virtual buttons. Thus, virtual buttons may be used to store and to auto-dial the stored CID number in the same manner as programmable buttons.

BRIEF DESCRIPTION OF THE DRAWING

In the drawing,

FIG. 2 shows a call record table utilized by the flow charts of FIGS. 5 and 6;

FIG. 3 shows an extension status table utilized by the flow charts of FIGS. 5 and 6;

GENERAL DESCRIPTION

Figure 1:
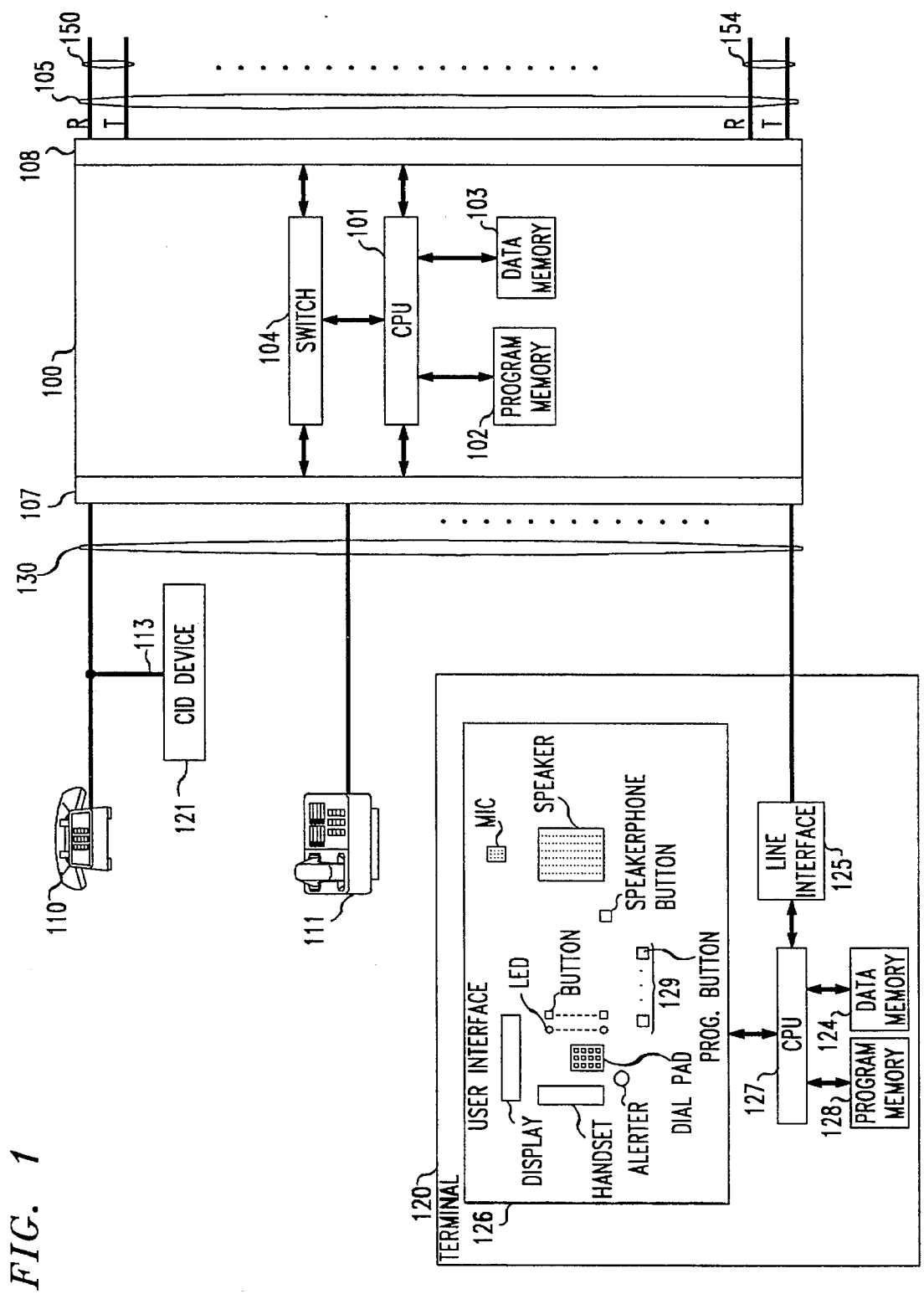
FIG. 1 is a block diagram of a telephone communication system useful for describing the present invention.

Shown in FIG. 1 is an illustrative block diagram of a communication system useful for describing the operation of the present invention. The system includes common control module or unit 100 which connects to one or more central office (CO) or PBX lines 105 via line interface 108 and which connects via interface 107 and loops (i.e., extensions) 130 to the plurality of station terminals such as 110–120. Illustratively, this communication system may be a Merlin® communication system such as described in U.S. Pat. No. 4,560,837 issued to Carson et al on Dec. 24, 1985. (Merlin is a registered trademark of AT&T).

The general operation of the communication system shown in FIG. 1 is as follows. Control unit 100 establishes and controls all station set communications. Control unit 100 includes switch 104, central processor unit (CPU) 101, program memory 102 and data memory 103. Program memory 102 provides instructions to CPU 101 for controlling switch 104 and interface units 107 and 108 to enable the various communication operating features and functions of the system, including those of the present invention. Data memory 103 is utilized by CPU 101 for storing and accessing data associated with performing the various functions and features programmed in program memory 102. In one embodiment, CPU 101 is a microprocessor; program memory 102 is read-only memory (ROM); and data memory 103 is random access memory (RAM). The interface circuits 107 and 108 may include well-known circuitry such as a ring detector, network control, line circuits, and other circuitry required by the system to establish, maintain and terminate communications. In addition, line interface 108 may contain circuitry to detect CID signalling. This circuitry is described in a previously-filed patent application of Bayerl 1-2-1 entitled "Communication System Utilizing Information Received During a Silent Interval Between Ringing Signals", Ser. No. 08/027,976, allowed on Sep. 21, 1994, incorporated by reference herein.

Each station terminal e.g., 120 may, illustratively, be represented as including line interface 125, user interface 126, processor (CPU) 127, program memory 128 and data memory 124. Line interface 125 includes the circuitry required to enable communications over facility 130. User interface representatively includes the handset, display, dial pad, line and feature buttons, associated Light Emitting Diode (LED) indicators, audio alerter and other well-known circuitry required to provide telephone communication at a terminal. In accordance with the present invention, station terminal 120 includes one or more programmable buttons 129 which can be programmed using the CID number being displayed thereat. The operation of the programmable button will be described in a later paragraph. Additionally, station terminal 120 may include a speakerphone with a speaker, microphone and a speakerphone activation button.

The CPU 127 controls station terminal 120 using instructions stored in program memory 128 and data stored in data memory 129 which enable the terminal to provide various communication features and functions, including those of the present invention. The station terminals 110–120 which operate with control unit 100 may be of two types. One type of station terminal, shown as 111, illustratively refers to an Enhanced Tip Ring (ETR) station terminal which includes a display and which communicates using control signals shown in FIG. 6 of the previously-referenced Bayerl patent application. Another type of station terminal 110 may be a conventional Tip/Ring (T/R) station terminal which does not include the display and may not include any of the programmable feature buttons or LEDs of the ETR station set. Additionally, a well-known CID device 121 may connect to extension 113 to display the CID number.

Before describing the invention, we briefly describe the operation of an illustrative communication system with which the station terminal and apparatus of the present invention may operate. The detailed description of such a communication system is described in the previously-referenced Bayerl patent application.

Special service information (e.g., CID) detected by CID circuitry in line interface 108 on an incoming line 105 to control unit 100 during a silent interval between ringing signals is stored in data memory 103 as part of a call record associated with the incoming line. In response to predetermined call condition(s), this special service information is included as part of a control signal sent over extension loop(s) 130 of the system. Also, the detected CID information can be regenerated in the silent interval between ringing signals sent to T/R equipment 110 and 121 attached to extension loops in the system as described in the previously-referenced Bayerl patent application. Since this information is part of the call record information, it is readily available for use when the various system call features are activated and for use in programming buttons, as will be described in a later paragraph. As described in the previously-referenced patent application, call features such as delayed ringing, hold, call transfers, line preselect, privacy, and switch hook status can be utilized to control where, when and if this information should be sent to various station terminals for display.

Before proceeding with the operating description of the present invention, it should be recognized that the present invention may be utilized in other telephone communication systems. Since such systems utilize a variety of hardware and programming techniques, no attempt is made to describe in detail the hardware or programs of other telephone communication systems.

With reference to FIG. 2 we describe an illustrative call record table 200 utilized in the previously-referenced Bayerl patent application, to store the special service information (e.g., CID, caller name, date, time or other data). Call record table 200 includes a number of columns including call/line number 201, line status 202, current CID 203, caller name 204, date 205, time 206, miscellaneous 207, programmed extensions 209 (extensions which have direct access to the line) and active extensions 208 (extensions at which the current line status applies). For our example, the communication system shown in FIG. 1 is assumed to have 5 CO lines (105) and 10 extensions (130). As shown in columns 201, each of the incoming CO lines (105), illustratively 1–5, have a separate row entry.

Call record table 200 shows a variety of line status conditions (column 202) at various CO lines, (column 201) to illustrate the various operating features of the present invention. How the call states of the call record table 200 are generated is detailed in the previously referenced Bayerl patent application. We now briefly describe what call conditions they represent. For example, CO line 1 is shown to be in an alerting state (column 202) with a call originating from 908-555-1212 (column 203). Each loop extension 1–5 connects one or more of station terminals 110–120 each station being programmed to have direct access to line 1 (column 209). Column 208 shows that line 1 is currently alerting at extensions 1 through 5. No other call information is available for this call, therefore columns 204–207 are blank. The CO line 2 of column 201 is shown to be in an idle state (column 202), and hence no CID exists in column 203. The CO line 2 is programmed to be directly accessed at extensions 1–10 (column 209). Since the line is not active, column 208 is blank. The CO line 3 of column 201 is shown to be active on an outgoing call (column 202), and hence no CID exists in column 203. Column 209 shows that extensions 1–10 are programmed to have direct access to line 3, but column 208 shows that only extension 6 is connected to the line (i.e., active on the call). The CO line 4, in column 201, is shown to be active with an incoming call (column 202) originating from 908-454-3434 (column 203) and no other call information (columns 204–207). Column 209 shows that extensions 1–7 are programmed to have direct access to the line; column 208 shows that extensions 3 and 7 are active on the line. The CO line 5 of column 201 is shown to be alerting as a transferred call (column 202) with CID 313-667-2222 in column 203 and no other call information (columns 204–207). The CO line 5 of column 201 is shown to be programmed for access at extensions 1–5 (column 209), with the line transfer-alerting at extension 4 (column 208).

With reference to FIG. 3, we describe an illustrative extension status table 300. This table 300 uses the information from table 200 along with additional information about the configuration of the system. The extension status table 300 includes a plurality of columns including extension 301, station terminal type 302, speakerphone 303, switch hook status 304, active line status 305, display contents 306 and current facility selection (CFS) 307. As shown in column 301, each extension has its own row of entries. The entries for each extension are consistent with our example entries shown in call record table 200. Column 302 shows which of the terminal types 110–120 are connected to the extension, with ETR being of type 111 and T/R being of type 110. In our example, extensions 5 and 8 are shown in column 302 to be T/R, with the others being ETR. Column 303 indicates whether the phone at the extension has a speakerphone built in. In our example, extensions 1, 2, 7, 9 and 10 are shown in column 303 to have speakerphones. Column 304 indicates whether the extension is currently on or off-hook. Column 305 shows the status of any of the lines programmed for direct access from the given extensions that are currently active (i.e., extension is shown in column 208 of table 200). Column 306 shows the information being sent from the system to be displayed at the extension. Column 307 shows the CFS for the extension. When a line is listed as the CFS for an extension, the CID from table 200, column 203, if any, for that line will be the display contents. If the CFS is a line with no CID in column 203, or if there is no CFS for an extension in column 307, the display contents may be blank or show some other information; in this example the current date and day are shown. The CFS for an extension may either be determined by the system, using a feature such as ringing line preference, or by a user pressing a button or changing the switch hook status at an extension.

In the example, extensions 1, 2 and 5 are on-hook (column 304) with line 1 alerting (column 305). Since the CFS is set to line 1 for all three extensions (column 307), the display at the extensions is showing the CID, 908-555-1212, from 203 for line 1. At extension 3, the extension is off-hook (column 304) connected to an incoming call on line 4 and is also alerting for line 1 (column 305). Since the CFS at extension 3 is set for line 4 (column 307), the CID, 908-454-3434 from column 203 for line 4 is on the display. At extension 4, the extension is on-hook (column 304) with line 1 alerting and line 5 alerting as transferred call (column 305). Since the CFS is line 5 (column 307), the CID, 313-667-2222 from column 203 for line 5 is displayed at the extension. At extension 6, the extension is off-hook (column 304) on an outgoing call on line 3 (column 305). The CFS is set for line 3 (column 307) and since there is no CID in column 203 for line 3, the display shows the current date and day (column 306). Both extensions 7 and 9 are on-hook (column 304) and have no active lines (column 305). Therefore, their displays also show the date and day (column 306). Extension 8 is off-hook (column 304) on the incoming call on line 4 (column 305) (along with extension 3). Since its CFS is line 4 (column 307), the display shows the CID, 908-454-3434, from column 203 for line 4. Extension 10 is on-hook (column 304), but has pressed the line button for line 4 (preselected) (column 305) and thus requested line 4 as the CFS. Since the CFS is line 4 (column 307), the display shows the CID, 908-454-3434, from column 203 for line 4.

Figures 4, 5:
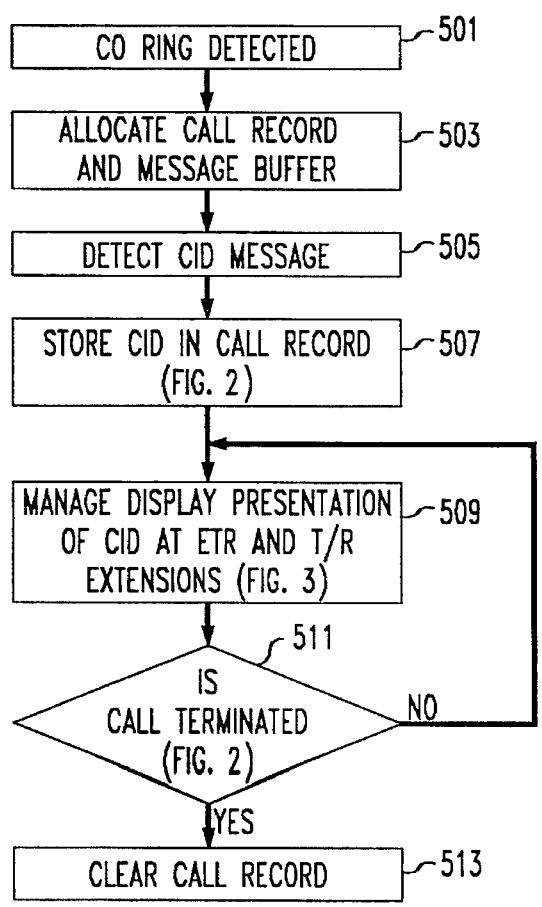
FIG. 4 shows a programmable button assignment table utilized by the flow charts of FIGS. 5 and 6.
FIG. 5 shows a flow chart describing the operation of the control unit of FIG. 1.

With reference to FIGS. 2, 3 and 5, we describe the general operation of control unit 100. In step 501 of FIG. 5, CO ringing is detected on one or more of the central office lines 105. Assume that central office line 1 was ringing, then in step 503 control unit 100 would allocate a call record and message buffer, 220, as shown in call record table 200. In step 505, CID receiver (part of line interface 108, described in the previously-referenced Bayerl patent application) detects the CID message and other associated information during the silent interval of the ringing signal. In step 507, control unit 100 stores the CID and other information in the call record, 220, for CO line 1 at columns 203–207 in call record table 200.

In step 509, control unit 100 determines for each extension how to manage the presentation of CID information depending upon the type of extension (ETR, TR, or both) and the extensions' current states. Reference is made to the previously-referenced Bayerl patent application for illustrative display management. For the purposes of the present invention, we assume that CID information is or is not available at a display associated with a station terminal. In step 511, it is determined if the call is terminated. If the call has not been terminated, control returns to step 509. If the call has been terminated, then in step 513 the call record is cleared.

FIG. 4 shows the programmable button table 400. This table illustrates the association of information with programmable buttons on each extension. The term "programmable button" refers to a location in data memory 103 in the control unit 100. This could either be a physical button 129 on a station terminal 120 or a virtual button associated with either station terminal 110 or 120. The table is used the same in either case; only the feature activation method differs, namely, either a button press or an activation code such as #1. Each extension may have a plurality of programmable buttons. Each button may be associated with a piece of information and that information may be accessed later by a user at that extension. The use of these buttons is discussed in a later section.

Figure 6:
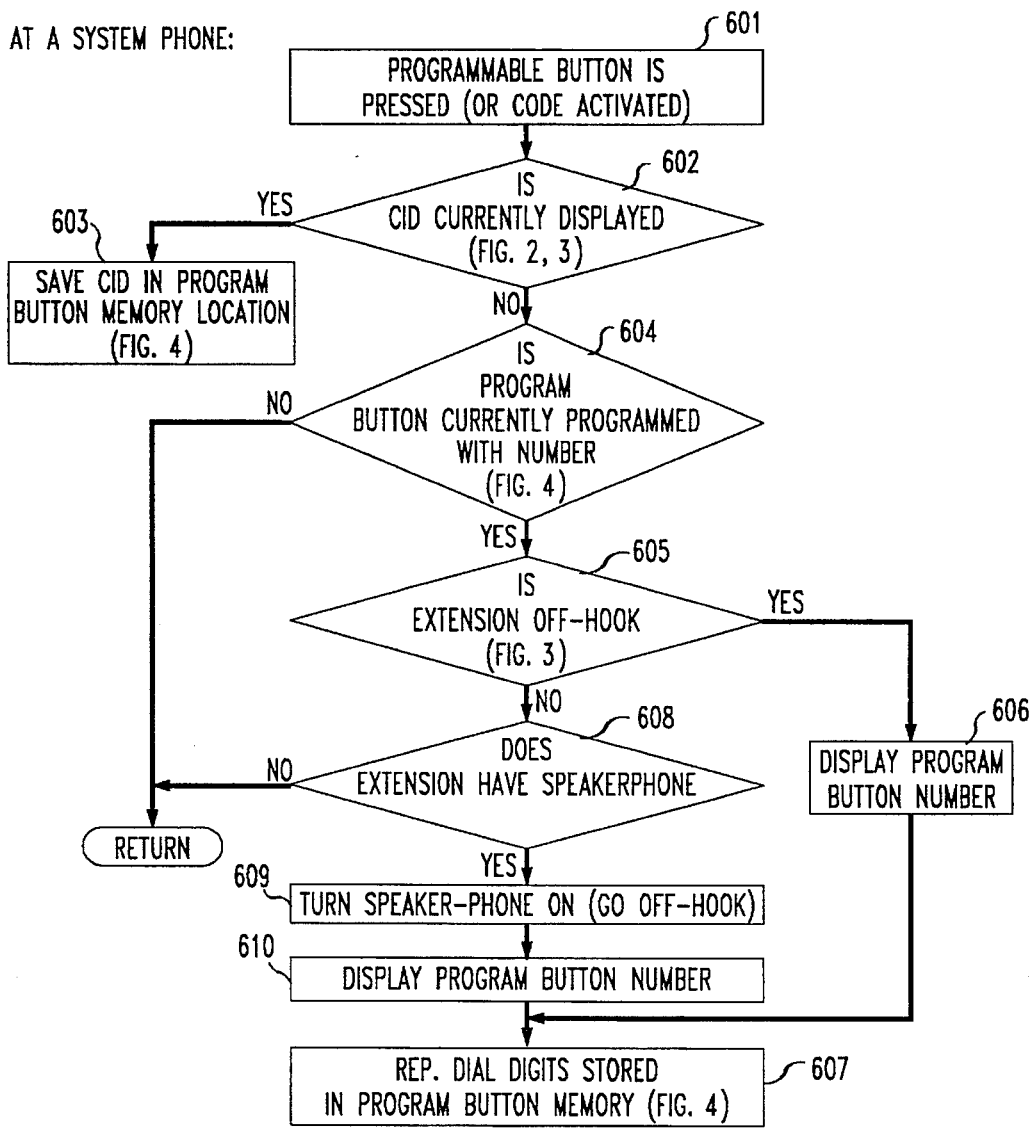
FIG. 6 shows a flow chart describing various features of the present invention.

With reference to FIG. 6, we describe the operation of a station terminal 120 having one or more programmable buttons 129 and a station terminal 110 having virtual buttons. The programmable button memory locations of station terminal 110 may be accessed by, for example, entering #1 via the touch-tone pad. The display of CID device 121 serves as the display for station terminal 110. This device 121 is optional. Virtual buttons may be programmed and used without it since information is stored in call record in control unit data memory 103. Optionally, station terminal 110 could have a display built in and CID device 121 would be unnecessary. The station terminal 110 utilizes a conventional T/R signaling as described in the previously-referenced Bayerl patent application. Virtual buttons may also be used at a station terminal similar to station terminal 120, regardless of whether there are programmable buttons 129 thereat.

The following description makes particular reference to FIG. 6 and joint reference to FIGS. 2–4. In step 601, a programmable button is pressed (or the virtual button code, e.g., #1, is entered at an extension). It may be assumed that the button has been allocated for this feature by the system. In step 602, control unit 100 checks column 306 to determine if a CID (and/or other information associated with the call) is being displayed at that extension. In the example illustrated by FIG. 3, only the CID is displayed. In another embodiment, any or all of the information in columns 204 or 207 may be displayed, but only CID is stored for later use in repertory dialing.

Returning to step 602, assume that the extension of interest is number 1. Column 306 shows that the display contains the CID for line 1. In step 602, since a CID number is presently displayed at extension 1 the CID is stored in programmable button assignment table 400 of FIG. 4. Table 400 shows that extension 1 has two programmable buttons A and B; button C has not been allocated by the system for use with this feature. If we assume that the user at extension 1 pressed programmable button A, then in step 603, the CID number from row 220, column 203 is stored, as shown, under button A, in column 402 of extension 1. Note, if line 1 disconnects (that is, extension 1 goes on-hook), then the CID number is removed from call record at column 203 and extension display 306 by step 513 of FIG. 5 but remains stored as button A for extension 1. Thereafter, if a new CID is displayed at extension 1, it may be used to write over the contents of programmable button A (by pressing button A) or may be stored in another programmable button B (by pressing button B).

In step 602, if we assume that no CID is displayed, for example extension 7 which is idle, when button A was pressed, then step 604 is performed. In step 604, control unit 100 checks if the programmable button that was pressed already has a CID number programmed. Since, in column 402 of table 400, extension 7 is shown to be "not programmed" for button A, then no action is taken by control unit 100. Had the user pressed button B at extension 7, then step 605 would be performed and the CID (201-444-8888) would be auto-dialed as described hereinafter. In step 605, control unit 100 checks table 300 to determine the status of extension 7. Since extension 7 is on-hook (column 304) and, in step 608 has speakerphone (column 303), when button B is pressed, then in step 609 control unit 100 turns the speaker phone "on" to go off-hook on a CO facility available to extension 7. Note, if extension 7 has multiple line buttons then control unit 100 selects the CO line using one of the preprogrammed line selection schemes (e.g., prime line, last line used, etc.). Thereafter, in step 610, the CID (201-444-8888) number is displayed on the display unit and, in step 607, the CID is auto-dialed, i.e., system generates touch-tones of stored number over CO line. In step 608, if extension 7 had no speakerphone, no action is taken by control unit 100. In step 605, if extension 7 had been off-hook on a CO line facility, then, in step 606, the CID number (201-444-8888) is displayed on the display unit and, in step 607, CID (201- 444-8888) is automatically (repertory) dialed.

As previously noted, if no actual programmable buttons are available at a station set, then a special activation code (e.g., #1) could be used to both program a number behind a virtual button A and to auto-dial a previously-programmed number behind the virtual button A. An extension, example station terminal 110, may have virtual buttons assigned to it for this feature in table 400 (note, control unit 100 keeps track of which extensions have actual or virtual buttons so that it knows whether or not to accept the virtual button activation commands (e.g., #1), but no differentiation is made in Table 4.

Figure 7:
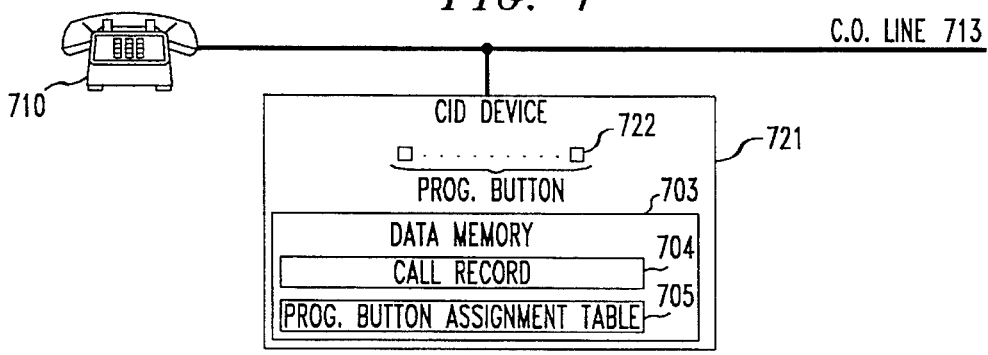
FIG. 7 shows a diagram of another embodiment of the present invention including a station terminal and CID device directly connected to one or more central office lines.

What has been described assumes telephones are connected to a PBX or key system where all the data storage and call processing are centrally controlled. In another embodiment, shown in FIG. 7, a Tip/Ring device such as 721 (or 710 with CID device circuitry 721 built in) with programmable buttons 722 could be connected directly to one or more CO lines 713 and carry out the same manipulation of stored data within the device itself. Call records 704 in data memory 703 store CID (and possibly other information) for the current calls, similar to table 200. Also stored in data memory 703 is a program button assignment table 705 which stores button assignments similar to table 4. Pressing program buttons 722 performs similar storage and dialing functions as described in the steps of FIG. 6.

In another embodiment, station terminal 710 includes a built-in CID device 722 and speakerphone and can perform the on-hook auto dialing as described in steps 609, 610 and 607 of FIG. 6.

What has been described is merely illustrative of the application of the principles of the present invention. Other arrangements and methods can be implemented by those skilled in the art without departing from the spirit and scope of the present invention.

We claim:

1. A communication system, including a controller, for switchably controlling connections between a plurality of external communication lines and one or more station terminals which connect thereto over extension loops, said communication system comprising:

memory means for receiving, during a silent interval between ringing signals, an incoming caller line identification (CID) number over one of said external communication lines, and means responsive to a programmable button depression signal received from a first one of said station terminals for identifying said CID number with a programmable button of said first one station terminal as the source of said programmable button depression signal and for storing said CID number in a memory associated with the identified programmable button and at said first one station terminal display means for displaying said CID number and programmable button, responsive to a user depression while said CID number is being displayed, for generating said programmable button depression signal.

2. The system of claim 1 wherein said controller includes means, responsive to a programmable button depression signal from said first one station terminal occurring following an off-hook condition established on a first external communication line, with no CID number displayed at said first one station terminal, for accessing said memory means to obtain said CID number and means for repertory dialing said CID number over said first external communication line.

3. The system of claim 2 wherein said display means of said first one station terminal displays said CID number being repertory dialed.

4. The system of claim 2 further comprising:

at said first one station terminal, a speakerphone means including means for going off-hook on said first external communication line, and means, responsive to a button activation signal generated when said programmable button is pressed, during an on-hook condition at said first one station terminal, for going off-hook on said first external communication line at said speakerphone means and repertory dialing said CID number over said off-hook first external communication line.

5. The system of claim 4 wherein said display means of said first one station terminal displays said CID number being repertory dialed.

6. Apparatus connected to an incoming communication line, comprising:

display means for displaying an incoming caller line identification (CID) number received over said incoming communication line during a silent interval between ringing signals, programmable button means responsive to a user depression during the display of said CID number for programming said programmable button means with said CID number, and means responsive to an activation of said programmable button means following an off-hook condition established on said incoming communication line, with no CID number displayed, for dialing said CID number over said incoming communication line.

7. Apparatus for enabling the automatic dialing of a telephone number, comprising:

means for displaying an incoming caller identification number (CID) received, during a silent interval between ringing signals, over a line connected to said apparatus and button means responsive to a first button depression for storing said incoming caller identification number in a memory associated with said first button depression and responsive to a second button depression occurring during an off-hook condition of said line, with no CID number being displayed, for dialing the incoming caller identification number stored in said memory.

8. A station terminal for communicating over one or more communication lines, said station terminal comprising:

display means for receiving during a silent interval between ringing signals, over a communication line, an incoming caller line identification (CID) number for displaying thereat, programmable button having a memory associated therewith, and means, responsive to a button activation signal generated when said programmable button is pressed while said CID number is being displayed, for programming said programmable button memory using said CID number and responsive to a second button depression occurring during an off-hook condition of said communication line, with no CID number being displayed, for dialing said CID number programmed in said programmable button memory.

9. The system of claim 8 further wherein said display means of said station terminal displays said CID number being repertory dialed.

10. The system of claim 8 further comprising:

speakerphone means including means for going off-hook on said communication line, and means, responsive to a button activation signal generated when said programmable button is pressed, during an on-hook condition at said station terminal, for going off-hook at said speakerphone means and repertory dialing said CID number over said off-hook communication line.

11. The system of claim 10 wherein said display means displays said CID number being repertory dialed.

12. A station terminal for receiving incoming telephone calls over a communication line, said station terminal comprising:

display means for receiving, over said communication line, during a silent interval between ringing signals an incoming caller line identification (CID) number for displaying thereat and means, responsive to a first predetermined one or more button depressions on a touch-tone pad, while said CID number is being displayed, for programming a memory means associated with said first predetermined one or more button depressions with said CID number.

13. The station terminal of claim 12 further comprising:

means, responsive to a second predetermined one or more button depressions on said touch-tone pad following an off-hook condition established on a first communication line, with no CID number being displayed, for repertory dialing said CID number over said off-hook first communication line.

14. The station terminal of claim 13 wherein said first and second predetermined one or more button depressions are the same.

15. The station terminal of claim 12 further comprising:

speakerphone means including means for going off-hook on said first communication line, and means, responsive to said second predetermined one or more button depressions on said touch-tone pad during an on-hook condition at said station terminal, for going off-hook on said first communication line and repertory dialing said CID number over said off-hook first communication line.

16. A method of operating a communication system, including a controller, for switchably controlling connections between a plurality of external communication lines and one or more station terminals which connect thereto over extension loops, said method comprising the steps of:

receiving an incoming caller line identification (CID) number, during a silent interval between ringing signals, over one of said external communication lines, and in response to a programmable button depression signal received from a first one of said station terminals, identifying said CID number with a programmable button of said first one station terminal as the source of said programmable button depression signal and storing said CID number in a memory associated with the identified programmable button.

17. The method of claim 16 further including the steps of:

accessing said memory to obtain said CID number in response to a programmable button depression signal from said first one station terminal occurring following an off-hook condition established on a first line, with no CID number displayed at said first one station terminal, and repertory dialing said CID number over said first external communication line.

* * * * *